United States Patent
Alam et al.

(10) Patent No.: US 12,401,612 B1
(45) Date of Patent: Aug. 26, 2025

(54) MULTI-TASK TWO-TOWER NEURAL NETWORK FOR CONTENT GUIDELINE EVALUATION

(71) Applicant: Microsoft Technology Licensing, LLC, Redmond, WA (US)

(72) Inventors: Shah Nawaz Alam, Bangalore (IN); Sasinandan Pedavegi, Sunnyvale, CA (US); Somya Gupta, Bengaluru (IN); Ritwik Kumar, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/590,892

(22) Filed: Feb. 28, 2024

(51) Int. Cl.
*G06F 16/332* (2025.01)
*H04L 51/212* (2022.01)
*H04L 51/52* (2022.01)

(52) U.S. Cl.
CPC ........... *H04L 51/212* (2022.05); *H04L 51/52* (2022.05)

(58) Field of Classification Search
None
See application file for complete search history.

(56) References Cited

U.S. PATENT DOCUMENTS

| | | | |
|---|---|---|---|
| 10,902,009 B1* | 1/2021 | Lenz, Jr. | G06F 16/24578 |
| 11,853,700 B1* | 12/2023 | Funk | G06F 40/30 |
| 2019/0073593 A1* | 3/2019 | Luo | G06N 3/088 |
| 2024/0061871 A1* | 2/2024 | Amrite | G06F 16/383 |

* cited by examiner

*Primary Examiner* — Natisha D Cox
(74) *Attorney, Agent, or Firm* — Cantor Colburn LLP; Renee D. Brown

(57) ABSTRACT

In an example embodiment, a solution is provided where a multi-task two-tower machine learning model is utilized to evaluate content against multiple different guidelines. Each of these guidelines represent a different task in the single multi-task two-tower machine learning model, and knowledge can be shared between the layers of the model devoted to each guideline, eliminating the need for separately trained models and also greatly improving the reliability of the predictions. The multi-task two-tower machine learning model is also capable of evaluating both text content and image content, via a respective tower utilized to embed such content into a shared latent n-dimensional space.

20 Claims, 7 Drawing Sheets

CRYPTOCURRENCY MONEYMAKERS
JOIN GROUP TO SEE WHAT MEMBERS ARE TALKING ABOUT

ABOUT THIS GROUP
A PLACE TO DISCUSS MAKING BIG MONEY IN CRYPTOCURRENCIES

SHOW ALL →

ADMIN
ADAM K. [OWNER]

2/15 MICHAEL JONES POSTED:
HAVE YOU HEARD ABOUT THIS NEW COIN CALLED FRANKENCOIN?

2/15 MARK H. POSTED:
NO, WHAT HAVE YOU HEARD?

RECENT
- LINKEDIN COMPANY GROUP
- LI - INCOMING ROTATIONAL APMS...
- NETWORKING
- CAREERS
- JUST DATA COMMUNITY

GROUPS
- LINKEDIN COMPANY GROUP
- LI - INCOMING ROTATIONAL APMS...
- JUST DATA COMMUNITY
SHOW REVIEWS ⌄

EVENTS
FOLLOWED HASHTAGS
- NETWORKING
- CAREERS
- ENTREPRENEURSHIP
SEE ALL

DISCOVER MORE

[JOIN]

DATA STRUCTURES AND ALGORITHMS
82,799 MEMBERS
[JOIN]

[Devu] REACT DEVELOPERS - REACTJS & REACT NATIVE PROFESSIONAL DEVELOPMENT MASTERMIND
82,799 MEMBERS
[JOIN]

[JS] JAVASCRIPT DEVELOPER
154,232 MEMBERS
[JOIN]

SHOW ALL →

WHERE SPONSORED CONTENT WOULD APPEAR IF THIS WAS A BRAND SAFE GROUP

*FIG. 5*

MULTI-TASK TWO-TOWER NEURAL NETWORK FOR CONTENT GUIDELINE EVALUATION

TECHNICAL FIELD

The present disclosure generally relates to technical problems encountered in machine learning. More specifically, the present disclosure relates to a multi-task two-tower neural network for content guideline evaluation.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. Some of the content presented is produced or otherwise provided by a third-party, such as a sponsor. This sponsored content may be posted to a social networking service to be presented to users of the social network service, oftentimes in conjunction with non-sponsored content (also known as organic content). For example, sponsored content may be interspersed in a social networking feed on the social networking service, with a feed being a series of various pieces of content presented in reverse chronological order, along with non-advertisement content such as a combination of notifications, articles, and job listings. In other examples, content may be posted in user groups, where groups of users with similar interests can share their insights and experiences by posting or consuming content.

BRIEF DESCRIPTION OF THE DRAWINGS

Some embodiments of the technology are illustrated, by way of example and not limitation, in the figures of the accompanying drawings.

FIG. 5 is a diagram illustrating a screen capture of a user interface 500, in accordance with an example embodiment.

DETAILED DESCRIPTION

Overview

Figure 1:
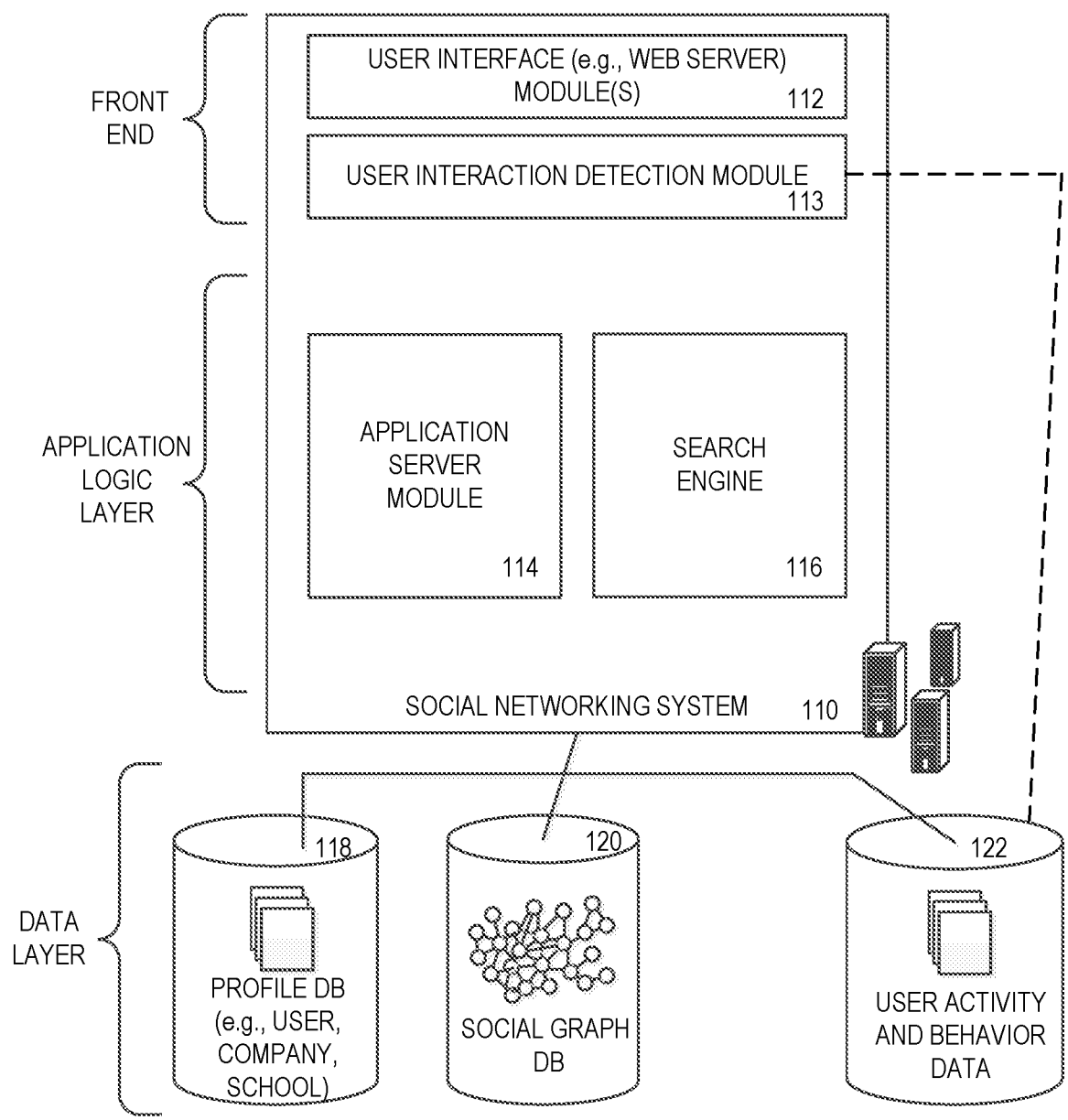
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Determining when content violates one or more guidelines can be technically challenging. Often these guidelines are important to ensure that the content is legal or otherwise appropriate for a given audience. While some guidelines are rather rigid, such as guidelines prohibiting content that promotes violence or contains inflammatory language, other guidelines can be more nebulous and frequently changing. This is especially true when the content is being evaluated against a guideline that is relevant to a sponsor's decision about whether to sponsor content appearing in proximity to the content being evaluated.

Brand safety is a major problem on social media platforms as content appearing beside sponsored content can have an effect on viewers, which potentially could tarnish the brand value of the sponsor and also lead to a poor return on investment for the sponsor.

Certain content presented in online networks may include material that entities providing sponsored content may not wish to be associated with. This might include content such as inflammatory language, money fraud attempts, and promotional material. One solution would be to use machine learning to detect when content is likely to violate some sort of guideline of the sponsored content entity. In such a solution, a separate machine learning model may be trained for each guideline or guideline type (e.g., one model to detect inflammatory language, another model to detect money fraud attempts, etc.).

A technical problem is encountered, however, with such a solution, owing to the fact that the models are trained and used independently of one another. Specifically, the reliability of each model is reduced because knowledge gained by one of the models is not able to be utilized by the other models (a lack of what is known as "knowledge transfer"). This knowledge includes not just whether or not a particular piece of content is likely to violate a given guideline but can also include more generic understanding of the content itself, such as the meaning of a phrase or graphic within the content. Lack of the ability to share this knowledge not only reduces the reliability of each model but also makes it more difficult to onboard a new model, such as when a new guideline is established. In such cases, enough training data must be generated to completely train the new model from scratch.

In an example embodiment, a solution is provided where a multi-task two-tower machine learning model is utilized to evaluate content against multiple different guidelines. Each of these guidelines represent a different task in the single multi-task two-tower machine learning model, and knowledge can be shared between the layers of the model devoted to each guideline, eliminating the need for separately trained models and also greatly improving the reliability of the predictions. The multi-task two-tower machine learning model is also capable of evaluating both text content and image content, via a respective tower utilized to embed such content into a shared latent n-dimensional space.

DESCRIPTION

In an example embodiment, novel machine learning techniques are used to evaluate content against a plurality of different guidelines. More particularly, a neural network is formed using at least one embedding layer that embeds data about the content into a shared latent n-dimensional space. Then the embedded data is passed through multiple different guideline-specific layers. Each guideline-specific layer corresponds to a different guideline and evaluates the content against the corresponding guideline. Information generated by one of these guideline-specific layers can be passed to another guideline-specific layer, allowing these layers to learn from each other, despite being directed to different guidelines. This information can include, calculations or evaluations made by the guideline-specific layers. Additionally, the use of the shared latent n-dimensional space makes onboarding a new guideline-specific layer (such as for a new guideline) much easier, as the same embeddings used for the other guideline-specific layers can be re-used for the new guidelines-specific layer, eliminating a sizable chunk of the training that would have been required for prior art machine learning techniques.

It should be noted that the techniques described herein can be used to evaluate whether content violates each of a plurality of guidelines, but can alternatively be used to evaluate whether content meets each of the plurality of guidelines (i.e., the evaluation could be performed in either way). For purposes of this document, the term "transgresses" shall be used to mean either violates or does not violate the corresponding guideline, depending upon which direction it is evaluating. Thus, when one indicates that a particular piece of content transgresses a first guideline, this means that the neural network has determined that the particular piece of content has either violated the first guideline or has determined that the particular piece of content has not violated the first guideline.

For brand safety, there will be multiple guidelines being evaluated against content near which sponsored content is being considered to be placed. One example guideline is IRC (which stands for Illegal, Regulated, and Commercial). This policy aims to prevent content that is illegal (e.g., solicits the commission of a crime), regulated (e.g., requests transfer of money in cryptocurrency), or commercial (e.g., offers to sell an item). Another example guideline is inflammatory language. Another example guideline is promotional (e.g., prohibits promotion of a particular good or service). Another example guideline is money scam (e.g., prohibits engaging in fraudulent activity).

Positive and negative data regarding those four guidelines may be gathered and used to train a multi-task machine learning model, which is jointly optimized on the guidelines.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown).

In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection.

Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behaviors may be logged or stored, for example, as indicated in FIG. 1, by the user activity and behavior database 122. This logged activity information may then be used by a search engine 116 to determine search results for a search query.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

At a threshold level, the present solution provides for the connecting of isolated optimization components and the continued automation of each component through artificial intelligence technologies.

Figure 2:
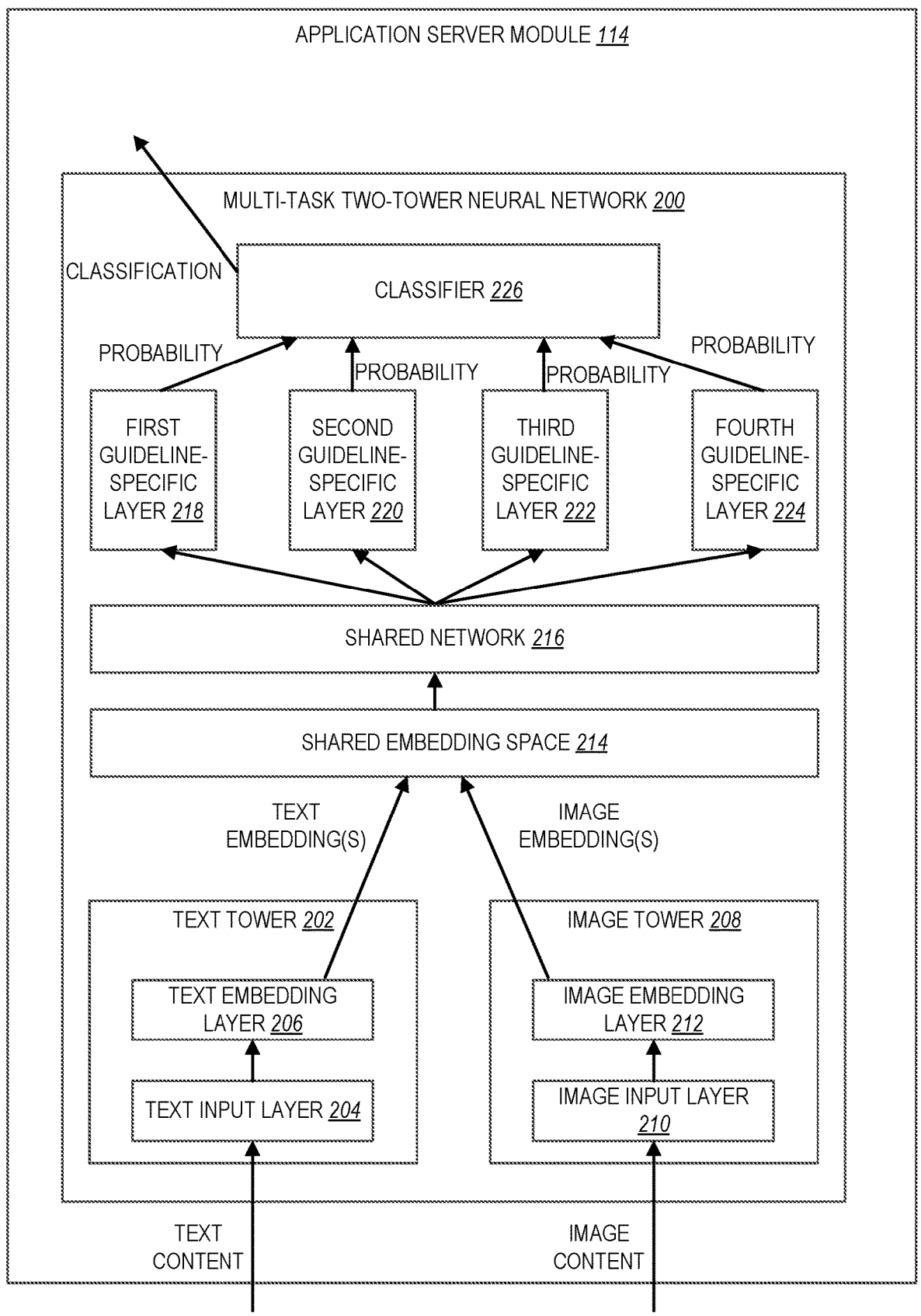
FIG. 2 is a block diagram illustrating the application server module of FIG. 1 in more detail, in accordance with an example embodiment.

FIG. 2 is a block diagram illustrating the application server module 114 of FIG. 1 in more detail, in accordance with an example embodiment. While in many embodiments the application server module 114 will contain many sub-components used to perform various different actions within the social networking system 110, in FIG. 1, only those components that are relevant to the present disclosure are depicted. Additionally, while a single application server module 114 is depicted here as containing many different components, in some example embodiments some or all of the different components may be located on different application server modules, and even some of the components may be located on client devices such as user devices.

Here, application server module 114 includes a multi-task two-tower neural network 200 used to evaluate content against multiple guidelines. A text tower 202 contains a text input layer 204 and a text embedding layer 206. Text contained in content is passed to the text input layer 204 and then through the text embedding layer 206, which then performs embedding on the text and stores the embedding(s) in a shared embedding space 214.

The text embedding layer 206 may generally be any layer that performs embedding of text. Embedding encodes the features to an n-dimensional embedding space. More particularly, the text embedding layer 206 assigns an embedding to the text that reflects the underlying "meaning" of the text, based on the text embedding layer's understanding of meaning. This embedding is a coordinate in an n-dimensional space such that the distances between coordinates is indicative of the similarity in meaning of the corresponding texts. Thus, for example, a first piece of text may be embedded to a first set of coordinates, a second piece of text may be embedded to a second set of coordinates, and a third piece of text may be embedded to a third set of coordinates. If geometrically (e.g., measured by cosine distance) the first set of coordinates is closer to the third set of coordinates than the second set of coordinates, this means that the first piece of text is more similar in meaning to the third piece of text than it is to the second piece of text.

In an example embodiment, the text embedding layer 206 is a pre-trained Bidirectional Encoder Representations from Transformers (BERT) model. In contrast with Fasttext, BERT uses context-dependent embeddings. This means that the vector of a word would be different based on its context, whereas models such as Fasttext obtain static word embeddings (context independent). The use of context-dependent representations allows the multi-task two-tower neural network 200 to obtain a richer understanding of the function of a word in a text, as language can be ambiguous.

Figure 3:
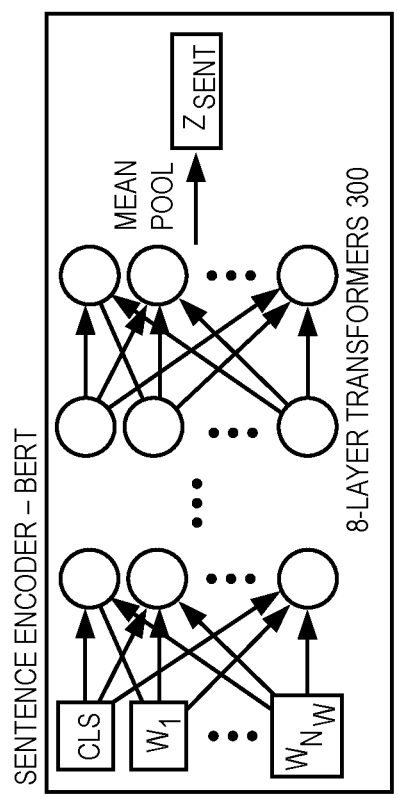
FIG. 3 is a block diagram illustrating a Bidirectional Encoder Representations from Transformers (BERT) model, in accordance with an example embodiment.

FIG. 3 is a block diagram illustrating BERT in accordance with an example embodiment. BERT uses transformer layer(s) 300 to encode the input sentence to embedding. Each transformer layer is defined as follows:

$$\text{TFLayer}(h^{n-1}) = FC(\text{MultiAttn}(h^{n-1}));$$

$$FC(x) = \text{relu}(xW_1 + b_1)W_2 + b_2;$$

$$\text{MultiAttn}(h^{n-1}) = \text{concat}(\text{head}_1(h^{n-1}), \ldots, \text{head}_k(h^{n-1}))W^O,$$

$$\text{head}_i(h^{n-1}) = \text{softmax}\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer. Here, a BERT model with 8 transformer layers is used, and the output sentence embedding $z_{sent}$ is defined as the meanpooling result of the last transformer layer's output. For simplicity, batch normalization and residual connections are omitted in the equations.

Referring back to FIG. 2, an image tower 208 contains an image input layer 210 and an image embedding layer 212. Image data contained in content is passed to the image input layer 210 and then through the image embedding layer 212, which then performs embedding on the image data and stores the embedding(s) in the shared embedding space 214.

The image embedding layer 212 may generally be any layer that performs embedding of images. Like with the text embeddings, image embedding encodes the features to an n-dimensional embedding space. More particularly, the image embedding layer 212 assigns an embedding to the image data that reflects the underlying "meaning" of the image data, based on the image embedding layer's understanding of meaning. This embedding is a coordinate in an n-dimensional space such that the distances between coordinates is indicative of the similarity in meaning of the corresponding image data.

Notably, since both the image embeddings and the text embeddings are mapped to the same n-dimensional space, stored in the shared embedding space 214, then comparison of the various meanings can occur not just between a text embedding and a text embedding or between an image embedding and an image embedding, but also between a text embedding and an image embedding. Thus, for example, a first piece of text may be embedded to a first set of coordinates, a second piece of text may be embedded to a second set of coordinates, and a first image may be embedded to a third set of coordinates. If geometrically (e.g., measured by cosine distance) the first set of coordinates is closer to the third set of coordinates than the second set of coordinates, this means that the first piece of text is more similar in meaning to the first image data than it is to the second piece of text. In an example embodiment, the image embedding layer 212 is a Contrastive Language-Image Pre-Training (CLIP) model. CLIP is a type of neural network trained on a variety of image/text pairs. A CLIP loss function aims to maximize the cosine similarity between the image and text embeddings for the N genuine pairs in the batch while minimizing the cosine similarity for the $N^2-N$ incorrect pairings. The optimization process involves using a symmetric cross-entropy loss function that operates on these similarity scores.

A shared network 216 is then used to learn the relationships between the embeddings stored in the shared embedding space 214 (representing the text and images) and the guidelines established in different guideline specific layers, such as first guideline-specific layer 218, second guideline-specific layer 220, third guideline-specific layer 222, and fourth guideline-specific layer 224. Thus, these relationships represent the relationships between the meanings of the pieces of content (e.g., text, images) and the effect that this meaning has on whether a particular guideline is violated.

Each of these guideline-specific layers 218-224 correspond to a different guideline. For example, first guideline-specific layer 218 may correspond to an IRC guideline, second guideline-specific layer 220 may correspond to an inflammatory language guideline, third guideline-specific layer 222 may correspond to a promotional guideline, and fourth guideline-specific layer 224 may correspond to a money scan guideline. Each of these guidelines-specific layers 218-224 is trained to output a probability score reflective of the likelihood that particular content transgresses the corresponding guideline. Notably, through the use of shared network 216, information generated through the execution of one guideline-specific layer 218-224 may be passed to any or all of the other guideline specific layers, allowing them to learn certain aspects from each other. While each guideline is different, that does not mean that information generated from the evaluation of one guideline against a piece of content is not relevant to the evaluation of another guideline against that piece of content. Thus, the sharing of such information allows for a more reliable output of each of the guideline-specific layers 218-224, and thus ultimately of the multi-task two-tower neural network 200 as a whole.

Additionally, the use of the shared network 216 and the shared embedding space allows for additional guideline-specific layers to be added without needing to completely train them from scratch. Rather, the embeddings used for the existing guideline-specific layers can be reused for the training of the new guideline-specific layer, eliminating the need for performing embedding during the training.

Each of the guideline-specific layers 218-224 therefore acts as a separate task that the shared network 216 is trained to optimize over, resulting in a multi-task two-tower neural network.

It should be noted that while this figure depicts a two-tower neural network, in practice any number of towers may be provided, one for each input modality. Thus if, for example, an administrator wishes to add a third modality, such as to evaluate videos, then a third tower with an embedding layer for that new modality can be added, yet still resulting in embeddings that are stored in the same shared embedding space 214.

The shared embedding space 214 allows each of the guidelines to be evaluated with additional context that would not have been available without a shared embedding space 214. As an example, assume a piece of text that says "go for the crypto" and an accompanying image depicts a person holding something labelled as a virtual coin while dollar signs appear all round the person. Neither one of these pieces alone might indicate enough of a violation to transgress a policy against promotion of cryptocurrency. The text "go for the crypto," while mentioning crypto, does not contain words that unequivocally promote the buying or selling of cryptocurrency, while the image showing the person may be difficult for a computer to interpret as necessarily promoting the buying and selling of cryptocurrency. However, if the text and image are evaluated together, then the corresponding guideline specific layer 218-224 has more context and thus is able to make a better determination if the guideline has been transgressed.

The shared network 216 additionally allows for cross-guideline knowledge sharing. For example, an IRC guideline and a promotion guideline may have some overlapping determinations about whether content acts to promote "something". If the IRC guideline-specific layer determines that the content promotes a book, but that promotion of the book does not violate the IRC policy, this determination can be shared with the promotional policy, which can make its own determination about whether promoting a book violates the promotional guideline, without needing to re-determine whether the content promotes the book.

It should also be noted that the guideline-specific layers used can vary based on the entity that is interested in the outcome of the evaluation, such as the sponsor of content where the sponsor is trying to determine whether it is safe to have their sponsored content appear beside the content being evaluated, or in the same user group as the content being evaluated.

A classifier 226 then classifies the content based on the outputted probabilities from each of the guideline-specific layers 218-224. This classification may reflect some aspect of the content related to the probabilities, such as a classification that the content is "brand safe" or "brand unsafe". This classifier 226 therefore can also vary based on the entity that is interested in the outcome of the evaluation. For example, the classifier 226 may contain a threshold for each guideline, and use the fact of whether the probability that the content transgresses the guidelines passes the corresponding threshold in its determination of how to classify the content. These thresholds may vary based on the entity that is interested in the outcome of the evaluation (e.g., one sponsor may have more of a tolerance for inflammatory language than another).

The classifier 226 may also handle different types of evaluations in different ways. For example, if the sponsor is trying to determine whether an entire user group is "brand safe" or not, then the classifier 226 may perform a group-level inference on different content sources. These sources include the group information itself, such as the group's title, which may indicate the intent with which the group was created, and some number of posts previously posted to the group. The title and description may therefore be passed through the multi-task two-tower network 200, with the classifier classifying the entire user group as "brand unsafe" if any of the probabilities generated by the guideline-specific layers 218-224 pass a corresponding threshold (e.g., if any of the guidelines was violated by the title or description). Then, the prior posts may be passed through the multi-task two-tower network 200 (i.e., the operations of the multi-task two-tower network 200 are repeated for the actual posts instead of the group tile and description), with the classifier determining what percentage of posts have probabilities generated by the guideline-specific layers 218-224 that pass a corresponding threshold, and that percentage then being compared to some percentage threshold which, if exceeded, result in the user group being classified as brand unsafe. In that way, if either the title/description of the user group violates a guideline or some threshold level of posts in the user group violate a guideline, then the user group is classified as "brand unsafe." Once again, this percentage threshold, like the prior discussed thresholds, can vary based on entity.

In some cases the content being evaluated may be an image part (e.g., the post just contains text, no image). In that case, in an example embodiment, an "average" image is passed to the multi-task two tower neural network 200 when it is evaluating the text part, so as to not influence the outcome in either way but still allow the multi-task two-tower neural network 200 to operate in the same way as if the content contained both text and an image.

Figure 4:
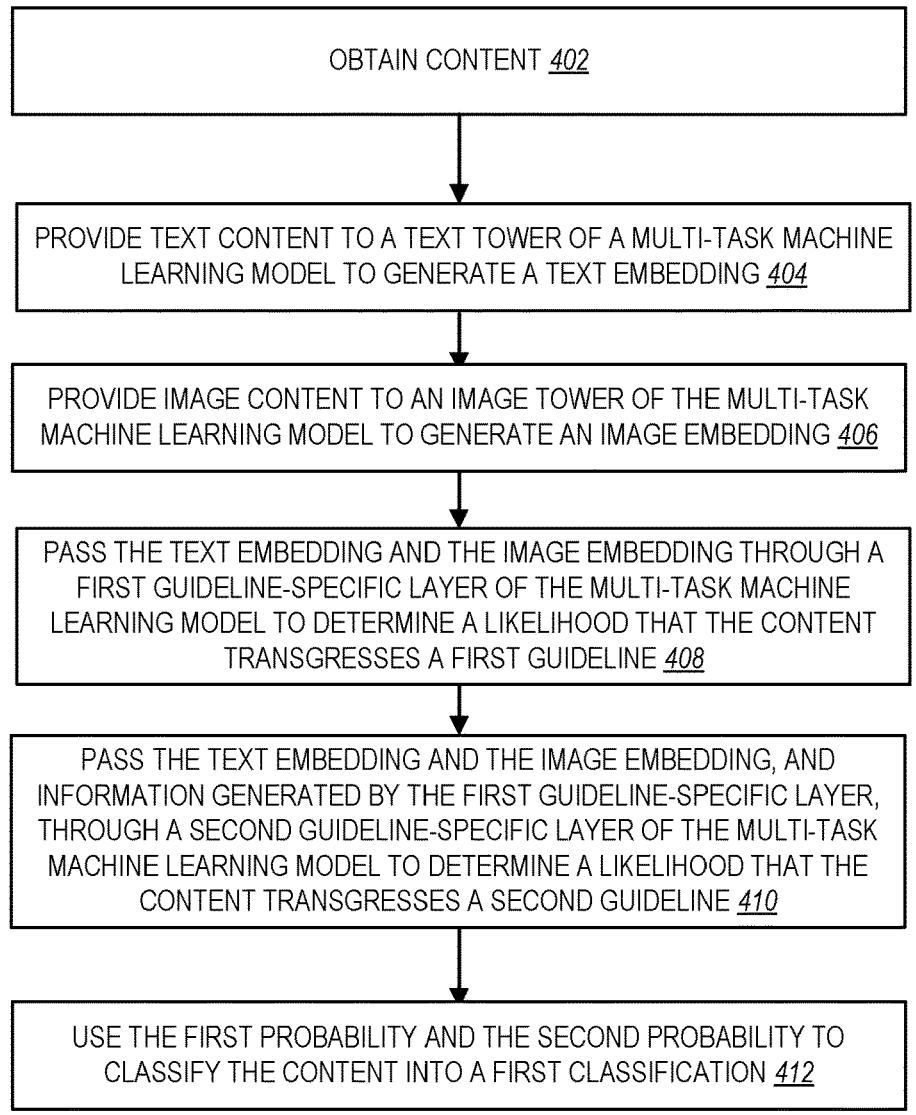
FIG. 4 is flow diagram illustrating a method, in accordance with an example embodiment.

FIG. 4 is a flow diagram illustrating a method 400, in accordance with an example embodiment. At operation 402, content is obtained. The content may include both text content and image content. At operation 404, the text content is provided to a text tower of a multi-task machine learning model to generate a text embedding. The text embedding defines a first set of coordinates in a latent n-dimensional space. At operation 406, the image content is provided to an image tower of the multi-task machine learning model to generate an image embedding. The image embedding defines a second set of coordinates in the latent n-dimensional space.

At operation 408, the text embedding and the image embedding are passed through a first guideline-specific layer of the multi-task machine learning model to determine a likelihood that the content transgresses a first guideline associated with the first guideline-specific layer. At operation 410, the text embedding and the image embedding, as well as information generated by the first guideline-specific layer, are passed into a second guideline-specific layer of the multi-task machine learning model to determine a likelihood that the content transgresses a second guideline associated with the second guideline-specific layer.

At operation 412, the first probability and the second probability are used to classify the content into a first classification.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

FIG. 5 is a diagram illustrating a screen capture of a user interface 500, in accordance with an example embodiment. The user interface 500 displays a group page, which includes a group title 502, a group description 504, and one or more posts 506. Also depicted is area 508, which is a portion of the user interface 500 where sponsored content would appear if the group is deemed to be "brand safe." As can be seen, sponsored content displayed in area 508 would appear next to posts 506, and thus it may be important to the entity that is distributing the sponsored content that the group be deemed to be "brand-safe."

Figure 6:
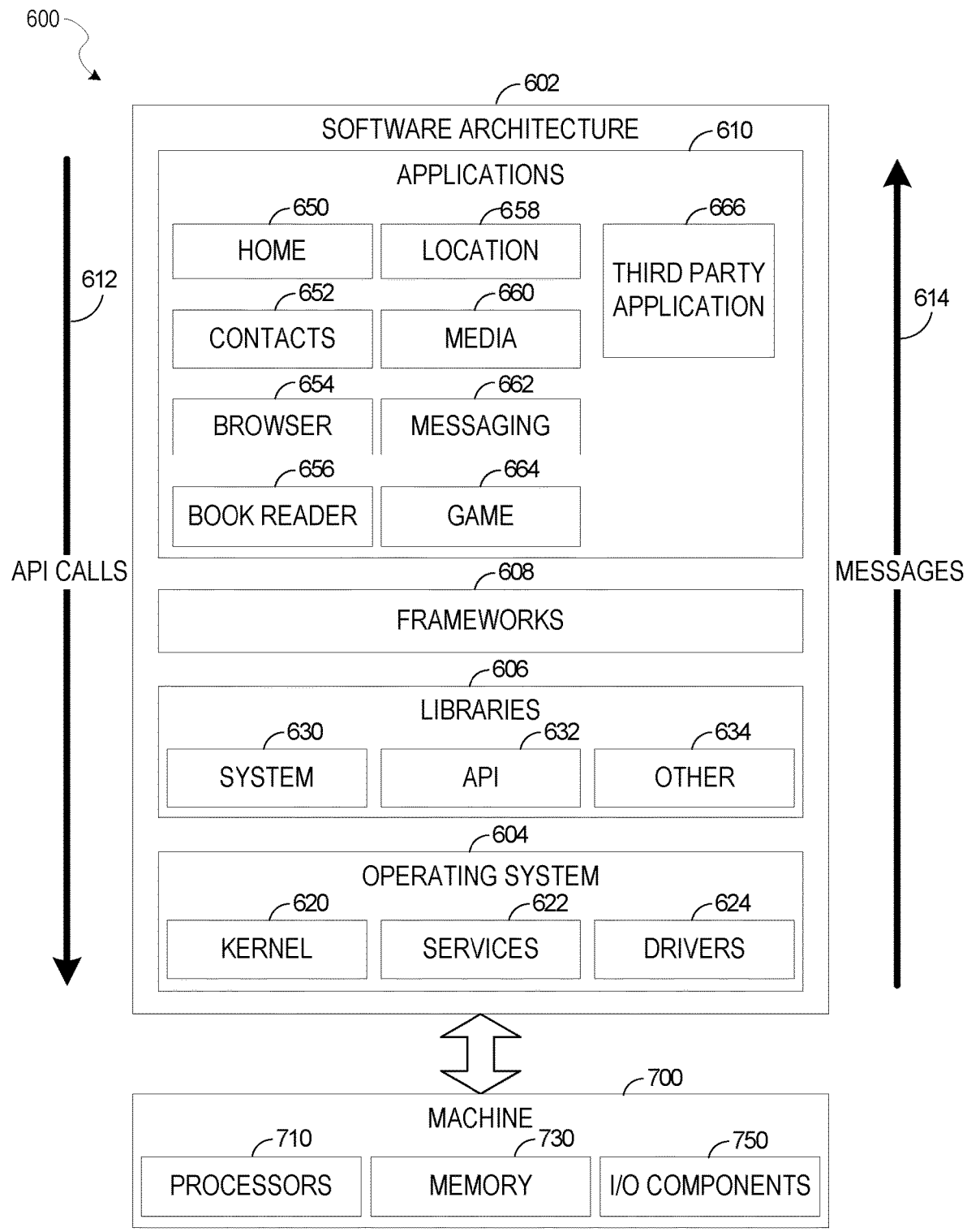
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionalities. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics [PNG]), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
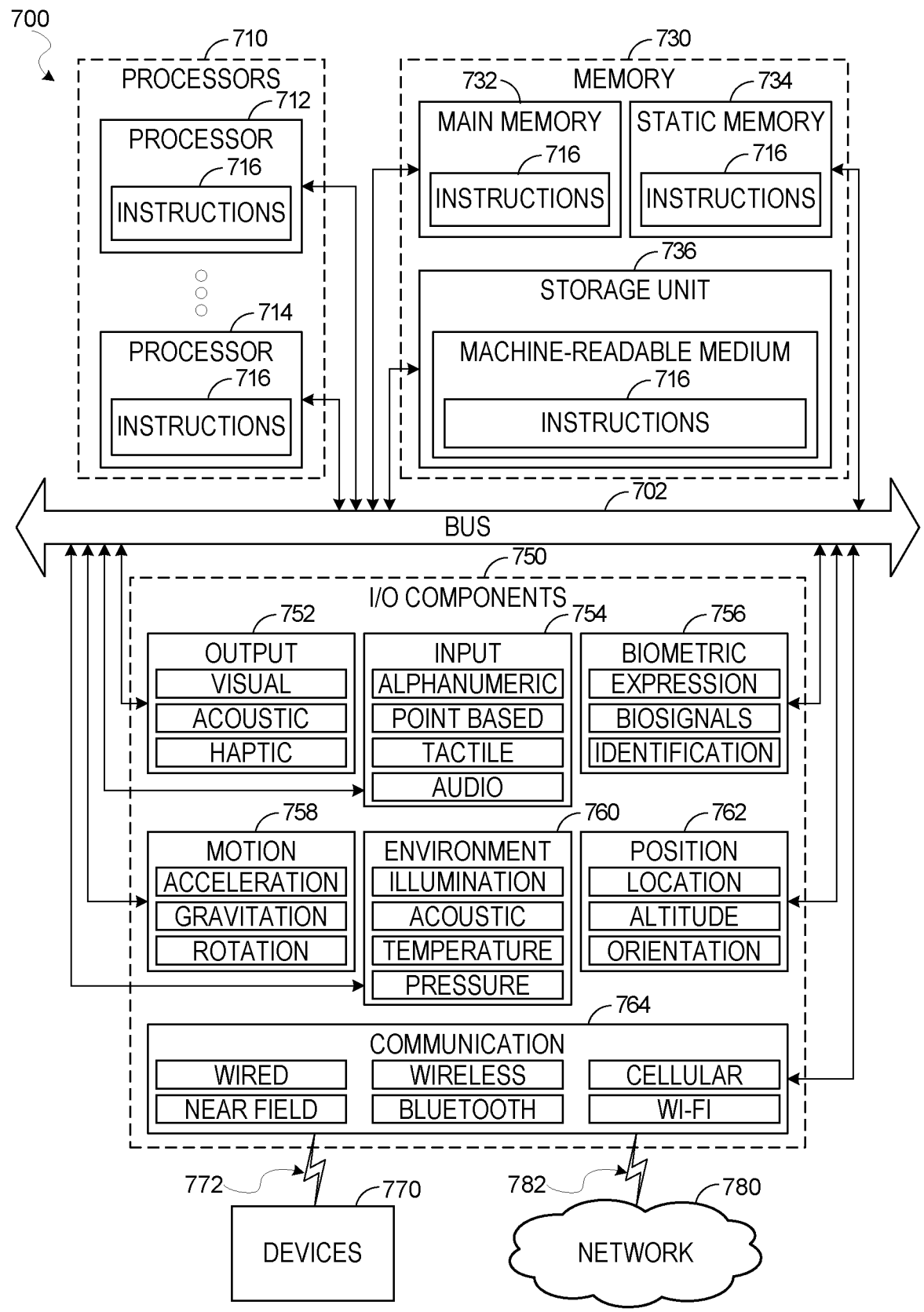
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 400 of FIG. 4. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one processor;
    a non-transitory computer-readable medium having instructions stored thereon, which, when executed by the at least one processor, cause the system to perform operations comprising:
    obtaining content;
    generating, by at least one embedding layer in a multi-task machine learning model, at least one embedding for the content, each embedding defining a set of coordinates in a shared latent n-dimensional space;
    passing the at least one embedding through a first guideline-specific layer of the multi-task machine learning model to determine a likelihood that the content transgresses a first guideline associated with the first guideline-specific layer; and
    passing the at least one embedding, as well as information generated by the first guideline-specific layer, into a second guideline-specific layer of the multi-task machine learning model to determine a likelihood that the content transgresses a second guideline associated with the second guideline-specific layer.

2. The system of claim 1, wherein the content includes text content and image content and the operations further include:
    providing the text content to a text tower of the multi-task machine learning model to generate a text embedding, the text embedding defining a first set of coordinates in the shared latent n-dimensional space; and
    providing the image content to an image tower of the multi-task machine learning model to generate an image embedding, the image embedding defining a second set of coordinates in the shared latent n-dimensional space.

3. The system of claim 1, wherein the content includes text content and image content, and the operations further include:
provide the image content to an image tower of the multi-task machine learning model to generate an image embedding without providing the text content to a text tower of the multi-task machine learning model, allowing the at least one embedding for the content to be generated without using text information.

4. The system of claim 1, wherein the content relates to a user group in an online network.

5. The system of claim 4, wherein the operations further include determining intent of the user group based on at least one of a group name or group description of the user group, by passing the group name or group description into a text tower of the multi-task machine learning model to generate an embedding for the user group.

6. The system of claim 1, wherein the content is information regarding a user group and wherein the operations further include applying a first classification to the user group in response to a determination that at least one of the likelihood that the content transgresses the first guideline passes a first threshold or the likelihood that the content transgresses the second guideline passes a second threshold.

7. The system of claim 1, wherein the operations further include:
wherein the content is information regarding a user group and wherein the operations further include applying a first classification to the user group in response to a determination that neither the likelihood that the content transgresses the first guideline nor the likelihood that the content transgresses the second guideline passes a second threshold; and
in response to the determining, repeating the generating, passing the at least one embedding through the first guideline-specific layer of the multi-task machine learning model, and passing the at least one embedding, as well as information generated by the first guideline-specific layer, into the second guideline-specific layer of the multi-task machine learning model, for each of a plurality of posts in the user group, with each post corresponding to content within the group, producing for each post in the plurality of posts, a likelihood that the post transgresses the first guideline associated with the first guideline-specific layer and a likelihood that the post transgresses the second guideline associated with the second guideline-specific layer;
calculating a percentage of the plurality of posts whose likelihood that the corresponding post transgresses the first guideline associated with the first guideline-specific layer passes the first threshold or the likelihood that the content transgresses the second guideline passes the second threshold, or both; and
applying a second classification to the user group in response to a determination that the percentage passes a third threshold.

8. A method comprising:
obtaining content;
generating, by at least one embedding layer in a multi-task machine learning model, at least one embedding for the content, each embedding defining a set of coordinates in a shared latent n-dimensional space;
passing the at least one embedding through a first guideline-specific layer of the multi-task machine learning model to determine a likelihood that the content transgresses a first guideline associated with the first guideline-specific layer; and passing the at least one embedding, as well as information generated by the first guideline-specific layer, into a second guideline-specific layer of the multi-task machine learning model to determine a likelihood that the content transgresses a second guideline associated with the second guideline-specific layer.

9. The method of claim 8, wherein the content includes both text content and image content and the method further comprises:
providing the text content to a text tower of the multi-task machine learning model to generate a text embedding, the text embedding defining a first set of coordinates in the shared latent n-dimensional space; and
providing the image content to an image tower of the multi-task machine learning model to generate an image embedding, the image embedding defining a second set of coordinates in the shared latent n-dimensional space.

10. The method of claim 8, wherein the content includes both text content and image content and the method further comprises:
providing the image content to an image tower of the multi-task machine learning model to generate an image embedding without providing the text content to a text tower of the multi-task machine learning model.

11. The method of claim 8, wherein the content relates to a user group in an online network.

12. The method of claim 11, further comprising determining intent of the user group based on at least one of a group name or group description of the user group, by passing the group name or group description into a text tower of the multi-task machine learning model to generate an embedding for the user group.

13. The method of claim 8, wherein the content is information regarding a user group and wherein the method further comprises applying a first classification to the user group in response to a determination that either the likelihood that the content transgresses the first guideline passes a first threshold or the likelihood that the content transgresses the second guideline passes a second threshold, or both.

14. The method of claim 8, further comprising:
wherein the content is information regarding a user group;
applying a first classification to the user group in response to a determination that neither the likelihood that the content transgresses the first guideline nor the likelihood that the content transgresses the second guideline passes a second threshold; and
in response to the determining, repeating the generating, passing the at least one embedding through the first guideline-specific layer of the multi-task machine learning model, and passing the at least one embedding, as well as information generated by the first guideline-specific layer, into the second guideline-specific layer of the multi-task machine learning model, for each of a plurality of posts in the user group, with each post corresponding to content within the group, producing for each post in the plurality of posts, a likelihood that the post transgresses the first guideline associated with the first guideline-specific layer and thelikelihood that the post transgresses the second guideline associated with the second guideline-specific layer;
calculating a percentage of the plurality of posts whose likelihood that the corresponding post transgresses the first guideline associated with the first guideline-specific layer passes the first threshold or the likelihood that the content transgresses the second guideline passes the second threshold, or both; and applying a second classification to the user group in response to a determination that the percentage passes a third threshold.

15. A non-transitory machine-readable storage medium comprising instructions which, when implemented by one or more machines, cause the one or more machines to perform operations comprising:

obtaining content;

generating, by at least one embedding layer in a multi-task machine learning model, at least one embedding for the content, each embedding defining a set of coordinates in a shared latent n-dimensional space;

passing the at least one embedding through a first guideline-specific layer of the multi-task machine learning model to determine a likelihood that the content transgresses a first guideline associated with the first guideline-specific layer; and passing the at least one embedding, as well as information generated by the first guideline-specific layer, into a second guideline-specific layer of the multi-task machine learning model to determine the likelihood that the content transgresses a second guideline associated with the second guideline-specific layer.

16. The non-transitory machine-readable storage medium of claim 15, wherein the content includes both text content and image content and the operations further include:

providing the text content to a text tower of the multi-task machine learning model to generate a text embedding, the text embedding defining a first set of coordinates in the shared latent n-dimensional space; and providing the image content to an image tower of the multi-task machine learning model to generate an image embedding, the image embedding defining a second set of coordinates in the shared latent n-dimensional space.

17. The non-transitory machine-readable storage medium of claim 15, wherein the content includes both text content and image content and the operations further include:

providing the image content to an image tower of the multi-task machine learning model to generate an image embedding without providing the text content to a text tower of the multi-task machine learning model.

18. The non-transitory machine-readable storage medium of claim 15, wherein the content relates to a user group in an online network.

19. The non-transitory machine-readable storage medium of claim 18, wherein the operations further include determining intent of the user group based on at least one of a group name or group description of the user group, by passing the group name or group description into a text tower of the multi-task machine learning model to generate an embedding for the user group.

20. The non-transitory machine-readable storage medium of claim 15, wherein the content is information regarding a user group and wherein the operations further include applying a first classification to the user group in response to a determination that either the likelihood that the content transgresses the first guideline passes a first threshold or the likelihood that the content transgresses the second guideline passes a second threshold, or both.

* * * * *